(12) United States Patent
Morita et al.

(10) Patent No.: US 7,390,445 B2
(45) Date of Patent: Jun. 24, 2008

(54) METHOD OF PRODUCING COMPOSITE SHEET HAVING POLYOLEFIN FOAM LAYER

(75) Inventors: Kazuhiko Morita, Kanuma (JP); Satoshi Iwasaki, Kanuma (JP); Shinpei Arita, Kanuma (JP)

(73) Assignee: JSP Corporation (JP)

( * ) Notice: Subject to any disclaimer, the term of this patent is extended or adjusted under 35 U.S.C. 154(b) by 961 days.

(21) Appl. No.: 10/870,957

(22) Filed: Jun. 21, 2004

(65) Prior Publication Data

US 2004/0262802 A1 Dec. 30, 2004

(30) Foreign Application Priority Data

Jun. 27, 2003 (JP) ............... 2003-185242

(51) Int. Cl.
*B32B 27/32* (2006.01)
*B32B 5/18* (2006.01)
*B32B 27/22* (2006.01)
*B32B 27/20* (2006.01)

(52) U.S. Cl. ............... 264/45.9; 264/51; 264/53; 264/173.14; 264/173.19; 264/211

(58) Field of Classification Search ............... 264/45.9, 264/51, 53, 173.14, 173.19, 211
See application file for complete search history.

(56) References Cited

U.S. PATENT DOCUMENTS 6,300,257 B1 10/2001 Kirchberger et al.
6,552,131 B1 4/2003 Higuchi

FOREIGN PATENT DOCUMENTS

EP 0 559 189 9/1993
EP 1 318 008 6/2003

*Primary Examiner*—George R Koch, III
(74) *Attorney, Agent, or Firm*—H. Jay Spiegel; Robert L. Haines

(57) ABSTRACT

A method of producing a composite sheet having a foam layer of a first polyolefin-based resin and a surface layer of a second polyolefin-based resin provided on at least one side of the foam layer and containing a polymeric antistatic agent. The method includes coextruding through die a first melt containing the first polyolefin-based resin and a physical blowing agent and a second melt containing the second polyolefin-based resin, the polymeric antistatic agent and a volatile plasticizer to obtain the composite sheet. The amount of the polymeric antistatic agent is 4 to 100 parts by weight per 100 parts by weight of the second polyolefin-based resin and the amount of the volatile plasticizer is 5 to 50 parts by weight per 100 parts by weight of a total amount of the second polyolefin-based resin and the polymeric antistatic agent. The second polyolefin-based resin has a crystallization temperature of $Ta$ [° C.] and a melt viscosity of $Ma$ [Pa·s], while the polymeric antistatic agent has a crystallization temperature of $Tb$ [° C.] and a melt viscosity of $Mb$ [Pa·s], wherein $Ta$, $Tb$, $Ma$ and $Mb$ satisfy the following conditions:

$Tb < (Ta + 30°\ C.)$ $Mb < Ma$.

10 Claims, 2 Drawing Sheets

METHOD OF PRODUCING COMPOSITE SHEET HAVING POLYOLEFIN FOAM LAYER

BACKGROUND OF THE INVENTION

1. Field of the Invention

This invention relates to a method of producing a composite sheet having a polyolefin-based resin foam layer and an antistatic agent-containing, polyolefin-based resin layer provided on at least one side of the foam layer.

2. Description of Prior Art

Polyethylene foams have been hitherto used as cushioning materials and packaging materials. In particular, antistatic agent-containing polyethylene resin foams have been recognized to be suitable as packaging materials because of their small tendency to cause dust deposition, good softness and excellent cushioning property.

JP-A-H09-169072 discloses an antistatic laminated sheet composed of a polyethylene resin foam layer having a small expansion ratio and a polyolefin layer laminated on the foam layer and containing a bleeding-type antistatic agent. As the antistatic agent, a relatively small molecular weight surfactant such as a glycerin fatty acid ester, a polyoxyethylene alkylamine or an alkyl diethanolamide is used. The laminated sheet exhibits the antistatic property upon absorption of moisture in the air. Thus, under a relatively low humidity condition such as in the winter season, the antistatic property tends to be unsatisfactory. In a high humidity environment, on the other hand, the moisture-absorbed antistatic agent exudes from the sheet and stains its surface so that the surface becomes sticky and whitened. Further, the durability of the laminated foam is unsatisfactory. Namely, when subjected to a wash test using sonication in ethanol, the bleeding-type antistatic agent is washed away and the resulting laminated foam can no longer exhibit desired antistatic properties.

JP-A-2001-347589 discloses a laminated sheet composed of a polyolefin resin foam layer and a conductive non-foamed polyolefin resin layer laminated on the foam layer and containing carbon black. The known laminated sheet has a problem because the carbon black-containing layer, when thin, is apt to be torn and because the color of the sheet is limited to black.

JP-A-2003-136651 discloses a laminated foam composed of a polyolefin resin foam sheet and a synthetic resin layer laminated on the foam sheet and containing a polymeric antistatic agent. The laminated foam has excellent rigidity and can withstand repeated washings without loss of the antistatic property and, therefore, is suitably used as a returnable box. The laminated foam has a relatively large apparent density and is not fully satisfactory for utilization as packaging materials which are required to be soft and to have good cushioning properties.

SUMMARY OF THE INVENTION

It is the prime object of the present invention to provide a method capable of producing a composite sheet which has a polyolefin-based resin foam layer and an antistatic agent-containing, polyolefin-based resin layer provided on at least one side of the foam layer and which does not cause surface stains during use and which has good appearance, suitable softness and satisfactory cushioning property.

Another object of the present invention is to provide a method capable of producing a composite sheet of the above-mentioned type which can exhibit antistatic properties for a long period of service in a stable manner without being influenced by environmental conditions such as humidity.

In accordance with the present invention there is provided a method of producing a composite sheet having a foam layer of a first polyolefin-based resin and a surface layer of a second polyolefin-based resin provided on at least one side of said foam layer and containing a polymeric antistatic agent, comprising coextruding through a die a first melt comprising said first polyolefin-based resin and a physical blowing agent and a second melt comprising said second polyolefin-based resin and said polymeric antistatic agent to obtain the composite sheet, said method being characterized in that said second melt contains said polymeric antistatic agent in an amount of 4 to 100 parts by weight per 100 parts by weight of said second polyolefin-based resin and a volatile plasticizer in an amount of 5 to 50 parts by weight per 100 parts by weight of a total amount of said second polyolefin-based resin and said polymeric antistatic agent, and in that said second polyolefin-based resin has a crystallization temperature of $Ta$ [° C.] and a melt viscosity of $Ma$ [Pa·s] and said polymeric antistatic agent has a crystallization temperature of $Tb$ [° C.] and a melt viscosity of $Mb$ [Pa·s], $Ta$, $Tb$, $Ma$ and $Mb$ satisfying the following conditions:

$$Tb < (Ta + 30°\ C.)$$

$$Mb < Ma.$$

The composite sheet obtained by the method of the present invention exhibits excellent antistatic properties even immediately after having been produced. Therefore, even when the composite sheet is produced using a flamable physical blowing agent such as butane, it is possible to prevent fire accident which might be caused by static electricity. The composite sheet has thus a merit that it can be produced in a safe manner.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
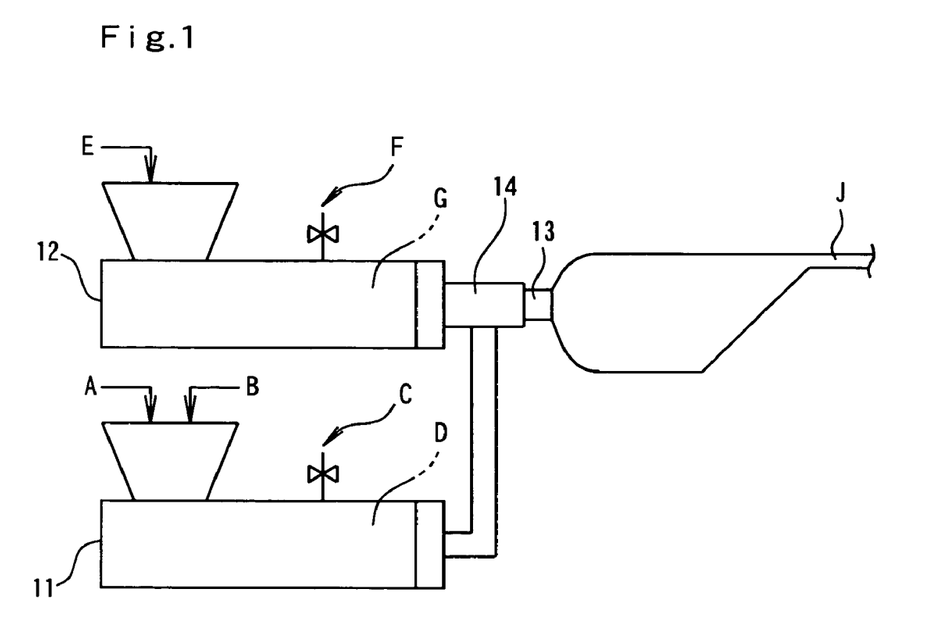
FIG. 1 is a schematic illustration of a device suitable for carrying out the method of the present invention.

The method of the present invention may be carried out using, for example, a device shown in FIG. 1. Referring to FIG. 1, the reference numeral 12 denotes a first extruder containing a kneaded mixture (first melt) G containing a first polyolefin-based resin feed E and a physical blowing agent feed F. Designated as 11 is a second extruder containing a kneaded mixture (second melt) D containing a second polyolefin-based resin feed A, a polymeric antistatic agent feed B and a volatile plasticizer feed C. The first and second melts G and D are coextruded through a die 13 connected to a combining feedblock 14 into a lower pressure zone to form an integral composite with the first melt being permitted to foam and expand.

Figure 2:
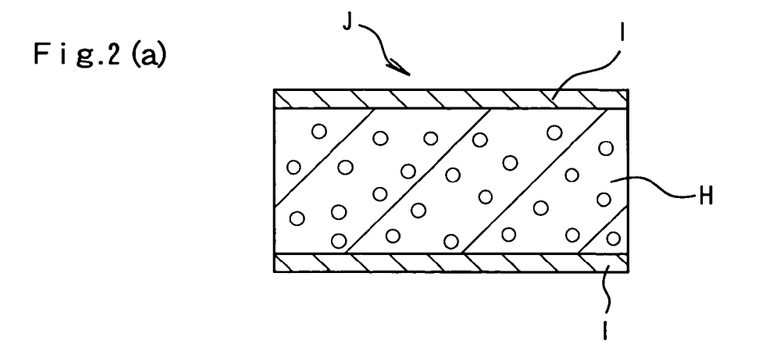
FIGS. 2(a) through 2(d) are sectional views schematically illustrating embodiments of composite sheets according to the present invention.

By suitably selecting the structure of the extruders and a die, the composite sheet J may have various layer structures, typical examples of which are illustrated in FIGS. 2(a) through 2(d), in which the same reference capitals designate similar component parts. A composite sheet J of FIG. 2(a), which has a first polyolefin-based resin foam layer H as a core and two, antistatic agent-containing, second polyethylene-based resin surface layers I provided on both sides of the foam layer H, may be produced by coextrusion of the first and second melts through a three-layer die. By using a two-layer die, a composite sheet J of FIG. 2(b) having a foam layer H and a surface layers I provided on one side of the foam layer H may be produced. FIG. 2(c) depicts a three layered composite sheet J having a foam layer H as a core, an antistatic agent-containing surface layer I and an antistatic agent-free, polyolefin-based resin surface layer K. Such a composite sheet may be prepared by using a three-layer die and an additional extruder for the surface layer K in the device shown in FIG. 1. By using a five-layer die in combination with three extruders, a five-layered composite sheet J having a core foam layer H, two surface layers I each containing a polymeric antistatic agent and two intermediate layers K containing no antistatic agent may be obtained by coextrusion.

More particularly, the first polyolefin-based resin feed E and, if necessary, a cell size controlling agent, are fed to the first extruder 12 and melted and kneaded, to which is then fed the physical blowing agent feed F under a pressure. The mixture is then kneaded to obtain the first melt G. Separately, the second polyolefin-based resin feed A and the polymeric antistatic agent feed B are fed to the second extruder 11 and melted and kneaded, to which the volatile plasticizer feed C is fed and kneaded to obtain the second melt D. The first and second melts G and D are adjusted to respective suitable temperatures and then coextruded. Thus, the melts flow through the die and eventually join into layers and then finally exit the die at the die lip to form a tube when the die is circular die. The tube is then cooled and longitudinally cut and spread into a composite sheet J. If desired, the coextrusion may be performed using flat die in place of the circular die. The use of circular die is advantageous in that formation of wave patterns (corrugation) is prevented and composite sheets having a large width of 1000 mm or more are easily obtainable.

The coextrusion of the melts may be also carried out such that the extrudates are laminated to each other at the exit of the die or after having been displaced from the die. The extruders, circular die, flat die, a cooling roller or cylindrical cooler, a cutter and other associated devices are well known in the art and the coextrusion in the method of the present invention may be carried out using suitable known devices.

The second melt may be suitably prepared by first dispersing the polymeric antistatic agent well in the second polyolefin-based resin and, subsequently, the volatile plasticizer is added to the resulting mixture and kneaded therewith. In the absence of the volatile plasticizer, the second resin and the antistatic agent can be kneaded while maintaining the melt viscosity thereof at a relatively high value. Therefore, the dispersion of the antistatic agent in the second resin can be facilitated to ensure the formation of a conductive network. The thus obtained mixture of the second resin and antistatic agent is then mixed with the volatile plasticizer to obtain the second melt which has a reduced melt viscosity and an improved extensibility. Therefore, the first and second melts can be coextruded while reducing the temperature of the second melt such that the foamability and expandability of the first melt are not adversely affected. Because of the high extensibility of the second melt, the extrudate of the second melt on the foamable extrudate of the first melt can appropriately follow the expansion of the foamable extrudate. Thus, the method of the present invention using the volatile plasticizer is particularly effective in the production of a composite sheet having a foam layer with a high expansion ratio.

Depending upon the kind of the second resin and the volatile plasticizer, the volatile plasticizer contained in the second melt may or may not remain in the extrudate. Even when the plasticizer remains partly or entirely in the extrudate, the amount thereof gradually decreases with time because of evaporation thereof. When the second resin is a polyethylene resin and the volatile plasticizer is butane, for example, almost no butane remains in the surface layer of the composite sheet according to the present invention. Because the surface layer is extremely thin, almost no cells are generally formed or only a small amount of very small cells are formed.

It is preferred that temperatures of the first and second melts G and D in the extruders 12 and 11 be controlled such that the foam layer obtained from the first melt has a high closed cell content, a relatively uniform cell structure and a desired apparent density while the second melt does not adversely affect the foaming and expanding of the first melt. In particular, the temperature T1 of the first melt is preferably between (Tc+5° C.) and (Tc+30° C.) and the temperature T2 of the second melt is preferably between (Ta+5° C.) and (Ta+30° C.), wherein Tc and Ta are crystallization temperatures of the first polyolefin-based resin and the second polyolefin-based resin, respectively. It is also preferred that the temperatures T1 and T2 satisfy the following conditions:

$$(T1-30°\ C.) \leq T2 \leq (T1+30°\ C.),$$

more preferably $$(T1-15°\ C.) \leq T2 \leq (T1+15°\ C.),$$

for reasons of minimizing the formation of open cells and preventing shrinkage of the composite sheet.

As described previously, it is preferred that the polymeric antistatic agent form a conductive network for reasons of improved antistatic efficiency of the surface layer. This can be generally achieved by thoroughly kneading the second polyolefin-based resin and the polymeric antistatic agent to uniformly disperse or distribute the antistatic agent in a web-like or laminar form in the resin.

In order to obtain improved antistatic efficiency of the surface layer, it is important that the crystallization temperature Ta [° C.] of the second polyolefin-based resin and the crystallization temperature Tb [° C.] of the polymeric antistatic agent should satisfy the following condition:

$$Tb < (Ta+30°\ C.),$$

since otherwise the polymeric antistatic agent is apt to crystallize and to form surface undulations of the surface layer, when the temperature T2 of the second melt is adjusted within the above-mentioned suitable range. The crystallization temperature Tb [° C.] of the polymeric antistatic agent is preferably 120° C. or lower. For reasons of easiness in kneading, Tb is preferably 40° C. or higher.

It is also important that the melt viscosity Ma [Pa·s] of the second polyolefin-based resin and the melt viscosity of Mb [Pa·s] of the polymeric antistatic agent should satisfy the following condition:

$$Mb < Ma,$$

since otherwise it is difficult to obtain improved antistatic efficiency of the surface layer. For reasons of capability of reducing the amount of the polymeric antistatic agent which is generally expensive while obtaining desired antistatic efficiency, Mb is preferably lower than 0.90 Ma (Mb<0.90 Ma), more preferably lower than 0.70 Ma (Mb<0.70 Ma). For reasons of obtaining good antistatic efficiency, Mb is preferably greater than 0.10Ma (Mb>0.10Ma), more preferably greater than 0.15 Ma (Mb>0.15 Ma).

For reasons of excellent antistatic efficiency, it is also preferred that the second polyolefin-based resin and the polymeric antistatic agent provide a phase structure index PI of 0.27 to 5.00. The index PI is defined as $(Ma/Mb)/(\phi a/\phi b)$ wherein Ma and Mb have the same meaning as above and $\phi a$ and $\phi b$ represent the volume fractions of the second polyolefin-based resin and the polymeric antistatic agent in the melted state, respectively. The index PI is preferably at least 0.30, more preferably at least 0.40. The upper limit of PI is preferably 3.00, more preferably 2.00. By using the above-defined PI value, the second polyolefin-based resin and the polymeric antistatic agent may be kneaded in an accelerated manner and the second melt obtained shows good extensibility and gives excellent antistatic efficiency. The volumes of the resin and the antistatic agent in the melted state may be expediently calculated from the density and weight thereof at room temperature. The melt viscosity Ma is preferably 250 to 1800 Pa·s, more preferably 300 to 1600 Pa·s, while Mb is preferably 80 to 400 Pa·s, more preferably 100 to 300 Pa·s.

The term "polyolefin-based resin" as used herein in connection with the first and second polyolefin-based resins used in the first and second melts, respectively, is intended to refer to a base resin (or a resin composition) containing a polyolefin resin as a major component. Thus, the polyolefin-based resin may contain an additional resin other than a polyolefin resin. The amount of such an additional resin is preferably not greater than 30% by weight, more preferably not greater than 15% by weight, most preferably not greater than 10% by weight. The term "polyolefin resin" as used herein is intended to refer to a homopolymer of an olefin, a copolymer of an olefin with a comonomer or a mixture thereof. The olefin copolymer preferably has an olefin monomer content of at least 50 mole %, more preferably at least 70 mole %, most preferably at least 90 mole %. Examples of the polyolefin resin include a polyethylene resin and a polypropylene resin.

Components of the first and second melts will be next described in detail.

The second polyolefin-based resin contained in the second melt for the formation of the surface layer of the composite sheet of the present invention is preferably a polyethylene resin for reasons of good flexibility in relation with surface protecting of wrapped articles and wrapping properties. Examples of the polyethylene resin include high density polyethylene, low density polyethylene and linear low density polyethylene, ethylene-vinyl acetate copolymers, and other ethylene copolymers, and mixtures of two or more of the above polymers and/or copolymers.

The polymeric antistatic agent used in the second melt preferably has a number average molecular weight of at least 2,000, more preferably 2,000 to 100,000, still more preferably 5,000 to 60,000, most preferably 8,000 to 40,000. The upper limit of the average molecular weight of the antistatic agent is about 1,000,000.

The number average molecular weight herein is obtained by gel permeation chromatography. When the polymeric antistatic agent is a hydrophilic resin containing a polyetheresteramide or a polyether as a main ingredient, for example, the gel permeation chromatography is carried out using a sample concentration of 3 mg/ml in o-dichlorobenzene as a solvent at a column temperature of 135° C. Polystyrene is used as a standard. The column temperature and solvent are suitably selected depending upon the kind of the polymeric antistatic agent.

The density of the polymeric antistatic agent is preferably greater than 935 kg/m$^3$ but not greater than 1500 kg/m$^3$, more preferably 950 kg/m$^3$ to 1200 kg/m$^3$. The surface resistivity of the polymeric antistatic agent is preferably less than $1\times10^{12}$ Ω. The polymeric antistatic agent preferably has a melting point of 70 to 270° C., more preferably 80 to 230° C., most preferably 80 to 200° C., for reasons of good kneading efficiency.

Illustrative of suitable polymeric antistatic agent are ionomer resins containing an alkali metal such as potassium, rubidium or cesium and hydrophilic resins containing polyetheresteramides or polyethers as a main ingredient. The polymeric antistatic agent preferably is a copolymer having a block or blocks of the same olefin polymer as the polyolefin resin of the second polyolefin-based resin, since the resulting antistatic agent has improved compatibility with the second polyolefin-based resin so that the antistatic efficiency is improved while preventing the degradation of the physical properties of the surface layer. Specific examples of the polymeric antistatic agent include ionomers containing ethylene-unsaturated carboxylic acid copolymer which is partly or entirely neutralized with an alkali metal such as potassium, rubidium or cesium, and compositions disclosed in U.S. Pat. No. 6,552,131.

The surface layer containing the polymeric antistatic agent can substantially retain its antistatic properties even after ultrasonic treatment in ethanol.

It is important that the polymeric antistatic agent should be used in an amount of 4 to 100 parts by weight per 100 parts by weight of the second polyolefin-based resin. If the amount is less than 4 parts by weight, the antistatic efficiency becomes unsatisfactory. For reasons of high antistatic efficiency, the amount of the polymeric antistatic agent is preferably at least 7 parts, more preferably at least 13 parts, per 100 parts by weight of the second polyolefin-based resin. Too large an amount of the polymeric antistatic agent in excess of 100 parts by weight causes difficulties in forming a surface layer and is also economically disadvantageous. From the standpoint of costs and film forming properties, the upper limit of the amount of the polymeric antistatic agent is preferably 70 parts by weight, more preferably 50 parts by weight, per 100 parts by weight of the second polyolefin-based resin.

Since the foam layer is not required to contain an antistatic agent with the method of the present invention, the foam layer can have a high expansion ratio and yet the composite sheet have a good appearance.

The volatile plasticizer serves to reduce the melt viscosity of the second melt and to improve the extensibility thereof. Because of the high extensibility of the second melt, the extrudate of the second melt on the foamable extrudate of the first melt can appropriately follow the expansion of the foamable extrudate. Thus, it is possible to reduce the thickness of the surface layer while preventing the formation of large cracks in the surface layer. Large cracks when formed will adversely affect the antistatic efficiency. Further, the volatile plasticizer can permit easy control of the temperature of the second melt and, therefore, the second melt does not adversely affect the foamability and expandability of the first melt upon coextrusion.

It is preferred that the volatile plasticizer have a boiling point of 120° C. or less, more preferably 80° C. or less, for reasons that the volatile plasticizer evaporates and can scarcely remain in the surface layer and can scarcely contaminate the surface layer. The boiling point of the plasticizer is generally −50° C. or higher.

Examples of the volatile plasticizer include aliphatic and alicyclic hydrocarbons having 2 to 7 carbon atoms, such as ethane, propane, normal butane, isobutane, normal pentane, isopentane, isohexane, cyclopentane, cyclohexane and heptane; halogenated aliphatic hydrocarbons having 1 to 3 carbon atoms, such as methyl chloride, ethyl chloride, 1,1,1,2-tetrafluoroethane and 1,1-difluoroethane; aliphatic alcohols having 1 to 4 carbon atoms, such as methanol, ethanol, normal propyl alcohol, isopropyl alcohol, normal butyl alcohol, isobutyl alcohol, sec-butyl alcohol and tert-butyl alcohol; and aliphatic ethers having 2 to 8 carbon atoms, such as methyl ether, ethyl ether, propyl ether, isopropyl ether, methyl ethyl ether, methyl propyl ether, methyl isopropyl ether, methyl butyl ether, methyl isobutyl ether, methyl amyl ether, methyl isoamyl ether, ethyl propyl ether, ethyl isopropyl ether, ethyl butyl ether, ethyl isobutyl ether, ethyl amyl ether, ethyl isoamyl ether, vinyl ether, allyl ether, methyl vinyl ether, methyl allyl ether, ethyl vinyl ether and ethyl allyl ether. These plasticizers may be used singly or in combination of two or more.

The volatile plasticizer should be used in an amount of 5 to 50 parts by weight per 100 parts by weight of a total amount of the second polyolefin-based resin and the polymeric antistatic agent. Too low an amount of the volatile plasticizer below 5 parts by weight causes generation of heat in the second melt during the kneading so that an increase of the temperature of the first melt will result when they join upon coextrusion. Thus, the foam layer from the first melt is apt to cause breakage of cells especially when the expansion ratio is high (the density of the foam layer is low). The amount of the volatile plasticizer is preferably at least 7 parts by weight, more preferably at least 10 parts by weight, per 100 parts by weight of a total amount of the second polyolefin-based resin and the polymeric antistatic agent. When the amount of the plasticizer exceeds 50 parts by weight, the foam layer fails to exhibit the desired properties inherent to the polyolefin resin and, further, an excessive plasticizer which has failed to dissolve in the resin may be ejected from the die lip. As a result, the appearance of the surface layer becomes no good due to the formation of holes and undulations. The amount of the volatile plasticizer is preferably no more than 45 parts by weight, more preferably no more than 40 parts by weight, per 100 parts by weight of a total amount of the second polyolefin-based resin and the polymeric antistatic agent.

It is preferred that the second melt further contain an inorganic powder, such as talc, zeolite, silica, calcium carbonate, sodium bicarbonate, a mixture of citric acid with sodium bicarbonate or a mixture of an alkali metal salt of citric acid with sodium bicarbonate, since the homogeneous dispersion of the volatile plasticizer in the second melt is accelerated. The inorganic powder is generally used in an amount of 0.01 to 5 parts by weight per 100 parts by weight of the second polyolefin-based resin.

The second melt may contain one or more additives such as a crystalline nucleus agent, an anti-oxidizing agent, a heat-stabilizing agent, a UV absorbing agent, a flame retardant, a filler and an antimicrobial agent, in an effective amount, generally no more than 10 parts by weight, preferably no more than 5 parts by weight, more preferably no more than 3 parts by weight per 100 parts by weight of the second polyolefin-based resin. The lower limit is about 0.01 part by weight.

The first polyolefin-based resin contained in the first melt for the formation of the foam layer of the composite sheet of the present invention is preferably a polyethylene resin having 910 to 935 kg/m$^3$ such as low density polyethylene or linear low density polyethylene. Low density polyethylene is particularly preferred for reasons of good expandability and foamability.

It is preferred that the polyethylene resin for use in the first melt have a melt tension at 190° C. of 20 to 400 mN, more preferably 30 to 300 mN, most preferably 40 to 250 mN, for reasons of obtaining a foam layer having a low open cell content and a low apparent density.

In the present specification, the melt tension is measured using a Melt Tension Tester II Model manufactured by Toyo Seiki Seisakusho, Ltd. The tester has a cylinder provided with a heater for maintaining a resin sample in a molten state at a predetermined temperature of 190° C. The cylinder is also provided with a vertically downwardly oriented orifice having an inside diameter of 2.095 mm and a length of 8 mm at the bottom thereof. The cylinder has a piston operable at a speed of 10 mm/min to extrude the melt downward through the orifice. The extrudate in the form of a string or filament solidifies as it moves downward. The extrudate is passed through a tension-detecting pulley (diameter: 45 mm), guided by guide rollers and then wound up around a take-up roller driven at 500 rpm. The tension at this time is detected by means of a load cell connected to the pulley and recorded by means of a recorder to determine an amplitude of variation of melt tension (ordinate) with time (abscissa). The melt tension is a median value of the amplitude at a stable amplitude portion. Extraordinary variations sometimes occurring in the recorded amplitude are ignored. When the extrudate is broken before the winding speed of 500 rpm is reached, the winding speed of 0.7×R rpm (wherein R is the winding speed at which the extrudate has been broken) is adopted for the measurement of the melt tension.

The first polyolefin-based resin preferably has a bending modulus of less than 300 MPa, more preferably 200 MPa or less, for reasons of good flexibility and cushioning property of the foam layer. The lower limit of the bending modulus is generally 80 MPa. The bending modulus is measured according to JIS K7171-1994 at a span of 30 mm and a bending speed of 2 mm/minute. Test sample has a thickness of 2 mm, a length of 40 mm and a width of 25 mm. A support has a radius $R_2$ of 2.0 mm and an indenter has a radius $R_1$ of 5.0 mm.

The physical blowing agent used in the first melt may be an organic or inorganic blowing agent. The organic blowing agent may be an aliphatic or alicyclic hydrocarbon such as propane, normal butane, normal pentane, isobutane, isopentane, normal hexane, isohexane, cyclopentane, cyclohexane or a mixture thereof. The inorganic blowing agent may be oxygen, nitrogen, carbon dioxide, air or a mixture thereof. For reasons of good compatibility with the polyolefin resin and good expandability, normal butane, isobutane or a mixture thereof is particularly preferable.

The amount of the blowing agent may vary with the kind thereof and the intended density of the foam layer but is generally in the range of 3 to 30 parts by weight per 100 parts by weight of the first polyolefin-based resin.

The first melt generally contains a cell diameter controlling agent such as talc, zeolite, silica, calcium carbonate, sodium bicarbonate, a mixture of citric acid with sodium bicarbonate or a mixture of an alkali metal salt of citric acid with sodium bicarbonate. The cell diameter controlling agent is generally used in an amount of 0.5 to 10 parts by weight per 100 parts by weight of the first polyolefin-based resin.

If desired, the polyolefin resin in the first melt may be used in conjunction with another resin such as a styrene resin, an ionomer, an elastomer or a rubber as long as the object of the present invention is not adversely affected.

The first melt may also contain one or more afore-mentioned additives for the second melt. Further, a shrink preventing agent may be also incorporated into the first melt. Such additives may be used in an effective amount, generally no more than 10 parts by weight, preferably no more than 5 parts by weight, more preferably no more than 3 parts by weight per 100 parts by weight of the first polyolefin-based resin. The lower limit is about 0.01 part by weight.

The composite sheet according to the present invention is suitably used as a cushioning material or a packaging material for various articles such as electric parts. The composite sheet preferably has an apparent density of 15 to 100 kg/m$^3$, more preferably 18 to 70 kg/m$^3$, most preferably 20 to 50 kg/m$^3$, and preferably exhibits a surface resistivity, after ethanol wash, of not more than $1.0 \times 10^{13}$ Ω, more preferably not more than $5.0 \times 10^{12}$ Ω, most preferably not more than $1.0 \times 10^{12}$ Ω. The thickness of the composite sheet is preferably 0.3 to 50 mm. For reasons of packaging efficiency, the thickness is more preferably 30 mm or less, still more preferably 10 mm or less, most preferably 8 mm or less. The composite sheet may be formed into a desired shape by thermoforming using a suitable mold. Such a composite sheet for use in thermoforming preferably has a thickness of 6 mm or less, more preferably 4 mm or less.

For reason of good cushioning properties, the thickness is preferably not less than 0.5 mm, more preferably not less than 0.8 mm.

If desired, two or more same or different composite sheets of the present invention may be laminated to obtain a laminate having a large thickness, such as 20 mm or more. The composite sheets to be laminated may differ from each other in any desired respects, such as thickness, cell diameter, apparent density, color, kind of the base resins constituting the surface and/or foam layers, and kind of additives.

The surface layer preferably has a thickness of 0.3 to 50 μm, more preferably 0.5 to 40 μm, most preferably 1 to 25 μm, for reasons of improved flexibility and balance of the costs and antistatic efficiency. The thickness of the surface layer may be controlled by control of the amount of the second melt extruded and the drawing speed of the extrudate.

The foam layer preferably has an open cell content of 60% or less, more preferably 50% or less, most preferably 30% or less.

In the present specification, the crystallization temperature (Ta, Tb, Tc), melt viscosity (Ma, Mb), melting point, and surface resistivity, open cell content, thickness and apparent density of composite sheets are measured as follows.

Crystallization Temperature:

Crystallization temperature is measured in accordance with JIS K7121-1987 using a differential scanning calorimeter. A sample (2 to 4 mg) is heated from room temperature (23° C.) to 200° C. at a rate of 10° C./min and then cooled to 40° C. at a rate of 10° C./min to obtain a DSC curve. The temperature of the exothermic peak apex represents the crystallization temperature. When two or more exothermic peaks are present, the highest apex temperature represents the crystallization temperature.

Melt Viscosity:

As a melt viscosity measuring device, RHEOVIS2100 manufactured by CEAST Corporation is used. A melt of a sample resin is extruded through an orifice (orifice inside diameter: 1.0 mm; orifice length: 10 mm) mounted on a tip of the device at a resin temperature of 190° C. and at a rate of shear of 100 sec$^{-1}$ to measure the melt viscosity.

Melting Point:

Melting point is measured according to JIS K7121-1987. A sample is first conditioned according to "Conditioning of Test Sample (2)" except that a cooling rate of 10° C./min is adopted. This is subjected to DSC measurement at a heating rate of 10° C./min to obtain DSC curve. The apex temperature of the endothermic peak represents the melting point. When two or more peaks are present, the highest apex temperature represents the melting point.

Surface Resistivity:

Surface resistivity is measured according to JIS K6911-1979. A sample (length: 100 mm, width: 100 mm, thickness sheet thickness as such) is cut from a composite sheet and allowed to stand at 23° C. under a relative humidity of 50% for 24 hours. Then, a voltage of 500 V is applied to the sample. A surface resistivity of the sample is measured one minute after the voltage impression. Surface resistivity may be measured with, for example, a resistivity measuring device TR8601 manufactured by Takeda Riken Kogyo Co., Ltd.

To measure a surface resistivity after treatment with ethanol, a similar sample is immersed in a 500 ml beaker containing 500 ml ethanol (purity: no less than 99.5 volume %) with the aid of a wire net. The beaker containing the sample immersed in ethanol is covered with a foil and is set in a pot of a ultrasonic cleaning device (for example, BRANSONIC 220 manufactured by Branson Inc.) containing water maintained at 23° C. Sonication is carried out for 24 hours. Make up ethanol at 23° C. is added to the beaker 8 hours and 16 hours after the start of the sonication in an amount so that the amount of ethanol in the beaker is 500 ml. The sample is taken out of the beaker and then allowed to stand at 30° C. under a relative humidity of 30% for 36 hours. The thus dried sample is immediately conditioned and measured for surface resistivity in the manner described above.

Open Cell Content:

Open cell content S (%) is measured according to ASTM D-2856-70 Procedure C and calculated by the following formula:

$$S (\%) = (Va - Vx) \times 100 / (Va - W/\rho)$$

where

Va: apparent volume (L) of the sample

Vx: true volume of the sample (total of the volume of closed cells and volume of the resin constituting cells)

W: weight (g) of the sample

ρ: density (kg/m$^3$) of the resin constituting the sample.

Vx may be measured with an air comparison pychnometer such as PYCHNOMETER Model 930 manufactured by Toshiba-Beckmann Inc. Samples having a length of 40 mm and a width of 25 mm are stacked in a non-pressed state in a sample cup of the pychnometer so that the apparent volume thereof is about 25 cm$^3$. The density ρ and the weight W are measured after the sample has been deaerated with a heated press and cooled. The apparent volume Va is measured from an increment of the volume when the sample is immersed in water contained a 200 ml measuring cylinder.

Thickness:

A sample sheet is cut laterally, i.e. in the direction normal to the extrusion direction. Pictures of the cut surface are taken at ten equidistant positions. The total thickness and the thickness of the surface layer or layers are measured in each of the ten positions. The arithmetic mean of the ten measured values represent the thickness of the composite sheet and the thickness of the surface layer. The thickness of the foam layer is obtained by subtraction of the thickness of the surface layer or layers from the thickness of the composite sheet. To facilitate the measurement, one of the foam and surface layers may be dyed.

Apparent Density:

A sample (length: 25 mm, width: 25 mm, thickness: sheet thickness as such) is cut from a composite sheet and weighed. The basis weight (g/m$^2$) of the sheet is calculated from the measured weight. The apparent density (kg/m$^3$) of the composite sheet is obtained by dividing the thus calculated basis weight by the thickness of the composite sheet determined as described above. The basis weight of the surface layer may be obtained by multiplying the thickness of the surface layer determined as described above by the density of the resin constituting the surface layer. When the surface layer contains a large amount of additives, such as inorganic materials, the basis weight of the surface layer is determined by subtracting the basis weight of the foam layer from the basis weight of the composite sheet. In this case, the basis weight of the foam layer is measured by removing the surface layer or layers from the composite sheet, followed by weighing the remaining foam layer. The density of the foam layer (kg/m$^3$) is calculated by dividing the basis weight of the foam layer by the thickness thereof.

The following examples will further illustrate the present invention. Parts and percentages are by weight except otherwise noted.

EXAMPLE 1

Two extruders having inside diameters of 90 mm and 120 mm and arranged in tandem were used for forming a first melt for a foam layer. An extruder having an inside diameter of 65 mm and a screw with a length/diameter (L/D) ratio of 46 was used for forming a second melt for surface layers. The extruders were connected to a three-layer circular die. Incidentally, a diameter of the die lip was 95 mm.

100 Parts of low density polyethylene (LDPE[a]) having a density of 922 kg/m$^3$, a melt viscosity of 850 Pa·s and a crystallization temperature [Tc] of 95.8° C. (trade name: NUC8321, manufactured by Nippon Unicar Co., Ltd.) and 3 parts of a cell controlling agent master batch (I) were charged in the 90 mm diameter extruder and kneaded with heating to obtain a melted mixture at about 200° C. To this mixture, a mixed blowing agent (referred to [butane] for brevity in Tables below) composed of 70% n-butane and 30% i-butane was added under a pressure in an amount of 16 parts per 100 parts of LDPE[a]. The resulting mixture was then fed to the 120 mm diameter extruder provided downstream of the 90 mm diameter extruder and kneaded to obtain a first melt having a temperature [T1] of 108° C.

100 Parts of low density polyethylene (LDPE[a]) having a density of 922 kg/m$^3$, a melt viscosity [Ma] of 850 Pa·s and a crystallization temperature [Ta] of 95.8° C. (trade name: NUC8321, manufactured by Nippon Unicar Co., Ltd.) and 43 parts of a polymeric antistatic agent containing a polyether-polypropylene block copolymer as a main ingredient and having a number average molecular weight of 14,000, a melt viscosity [Mb] of 270 Pa·s, a melting-point of 136° C., a crystallization temperature [Tb] of 90° C. and a density of 990 kg/m$^3$ (trade name: PELESTAT 300, manufactured by Sanyo Chemical Industries, Ltd.) were charged in the 65 mm diameter extruder and melted and kneaded to obtain a melted mixture having a temperature of about 200° C. To this mixture, a mixed volatile plasticizer composed of 70% n-butane and 30% i-butane (referred to [butane] for brevity in Tables below) was added under a pressure in an amount of 16 parts per 100 parts of the mixture to obtain a second melt having a temperature [T2] of 108° C. The kind, amount and physical properties of the above ingredients of the first and second melts, and the temperatures ([T1] and [T2]) of the first and second melts are also summarized in Table 1.1.

The first and second melts were then coextruded through the three-layer die. Thus, the first and second melts were streamed into the three-layer circular die and allowed to join to each other such that the first melt formed a core layer sandwiched between two surface layers of the second melt. The layered melts were discharged from the die lip to obtain a three-layered tube with the core layer being foamed and expanded. The tube was cooled by being drawn along a cylindrical cooler and the cooled tube was longitudinally cut to obtain a composite sheet having a thickness of 1 mm. The composite sheet had a foam layer sandwiched between two surface layers each having a thickness of 1.7 μm and containing the polymeric antistatic agent.

EXAMPLE 2

Example 1 was repeated in the same manner as described except that the amount of the blowing agent was reduced from 16 parts to 13 parts, that low density polyethylene (LDPE[b]) having a density of 917 kg/m$^3$, a melt viscosity of 640 Pa·s and a crystallization temperature of 93.5° C. (trade name: NUC8008, manufactured by Nippon Unicar Co., Ltd.) was substituted for LDPE[a] in the second melt for forming a surface layer and that the temperature [T2] of the second melt was adjusted to 115° C., as shown in Table 1.1. The composite sheet had a thickness of 1 mm and two surface layers each having a thickness of 2.3 μm.

EXAMPLE 3

Example 1 was repeated in the same manner as described except that low density polyethylene (LDPE[c]) having a density of 916 kg/m$^3$, a melt viscosity of 460 Pa·s and a crystallization temperature of 91.3° C. (trade name: NUC8009, manufactured by Nippon Unicar Co., Ltd.) was substituted for LDPE[a] in the second melt for forming a surface layer, that the amount of the cell size controlling agent master batch (I) was increased to 5 parts, and that the temperatures [T1] and [T2] of the first and second melts were adjusted to 107° C. and 109° C., respectively, as shown in Table 1.1.

EXAMPLE 4

Example 1 was repeated in the same manner as described except that stearic monoglyceride (trade name: S-100, manufactured by Riken Vitamin Co., Ltd., melting point: 65° C.) as a shrinkage preventing agent was added to the first melt in an amount of 1%, that the temperature [T1] of the first melt was adjusted to 107° C., as shown in Table 1.1 and that the thicknesses of the composite sheet and surface layers were changed. The composite sheet had a thickness of 5 mm and two surface layers each having a thickness of 8.8 μm. The monoglyceride was used in the form of a master batch having a monoglyceride content of 10% and containing LDPE[a] as a base resin.

EXAMPLE 5

Example 1 was repeated in the same manner as described except that low density polyethylene (LDPE[d]) having a density of 916 kg/m$^3$, a melt viscosity of 330 Pa·s and a crystallization temperature of 91.1° C. (trade name: NUC8350, manufactured by Nippon Unicar Co., Ltd.) was substituted for LDPE[a] in the second melt for forming a surface layer, that the cell size controlling agent master batch (I) was added to the second melt in an amount of 3 parts, and that the temperature [T1] of the first melt was adjusted to 107° C., as shown in Table 1.1.

EXAMPLE 6

Example 1 was repeated in the same manner as described except that dimethyl ether ([DME]) was substituted for butane plasticizer in the second melt and used in an amount of 13 parts in the second melt for forming a surface layer, as shown in Table 1.2.

EXAMPLE 7

Example 1 was repeated in the same manner as described except that the amount of the antistatic agent (PELESTAT) was reduced to 18 parts, as shown in Table 1.2.

EXAMPLE 8

100 Parts of low density polyethylene (LDPE[e]) having a density of 920 kg/m$^3$, a melt flow rate of 0.3 g/10 min, a melting point of 111.2° C. and a crystallization temperature [Tc] of 93.4° C. (trade name: DFD6775, manufactured by Nippon Unicar Co., Ltd.) and 0.3 part of a cell controlling agent master batch (II) were charged in a 115 mm diameter extruder and kneaded with heating to obtain a melted mixture at about 200° C. To this mixture, a mixed blowing agent (referred to [butane] for brevity in Tables below) composed of 70% n-butane and 30% i-butane was added under a pressure in an amount of 20 parts per 100 parts of LDPE[e]. The resulting mixture was kneaded to obtain a first melt having a temperature [T1] of 110° C.

100 Parts of low density polyethylene (LDPE[f]) having a density of 924 kg/m$^3$, a melt flow rate of 1.5 g/10 min, a melt viscosity [Ma] of 1200 Pa·s and a crystallization temperature [Ta] of 97.0° C. (trade name: JE330N, manufactured by Nippon Polyolefin Co., Ltd.), 18 parts of a polymeric antistatic agent having a melt viscosity [Mb] of 270 Pa·s, a melting point of 136° C. and a crystallization temperature [Tb] of 90.0° C. (trade name: PELESTAT 300, manufactured by Sanyo Chemical Industries, Ltd.). and 0.2 part of a cell controlling agent master batch (II) were charged in a 65 mm diameter extruder and melted and kneaded to obtain a melted mixture having a temperature of about 200° C. To this mixture, a mixed volatile plasticizer composed of 70% n-butane and 30% i-butane ([butane]) was added under a pressure in an amount of 20 parts per 100 parts of the mixture to obtain a second melt having a temperature [T2] of 110° C. as summarized in Table 1.2.

The first and second melts were then coextruded through a three-layer die. Incidentally, a diameter of the die lip was 95 mm. Thus, the first and second melts were streamed into the three-layer circular die and allowed to join to each other such that the first melt formed a core layer sandwiched between two surface layers of the second melt. The layered melts were discharged from the die lip at a die pressure of 70 kg/cm$^2$ to obtain a three-layered tube with the core layer being foamed and expanded. The tube was cooled by being drawn along a cylindrical cooler and the cooled tube was longitudinally cut to obtain a composite sheet having a width of 1100 mm and a thickness of 0.8 mm. The composite sheet had a foam layer sandwiched between two surface layers each having a thickness of 4.0 μm and containing the polymeric antistatic agent.

The coextrusion was performed with the discharge rate of the first melt from the die of 95 kg/hr. The foam layer was found to have an average cell wall thickness of 7.8 μm. The composite sheet was taken up at a rate of 71.6 m/min. The discharge rate of the second melt was adjusted at 35 kg/hr so that the basis weight of each of the surface layers was 3.7 g/m$^2$. The composite sheet had excellent flexibility and cushioning properties.

COMPARATIVE EXAMPLE 1

To the first melt, which is same as that of Example 1 except that the blowing agent was used in 17 parts, the same polymeric antistatic agent (PELESTAT) as that used in Example 1 was added in an amount 17 parts per 100 parts of LDPE[a]. This was extruded through a die to obtain a single layer foam sheet having a thickness of 2 mm. Because of breakage of cells, the surface of the foam sheet was roughened and had poor appearance. The foam sheet failed to exhibit satisfactory cushioning properties.

COMPARATIVE EXAMPLE 2

To the first melt of Example 1, a surfactant antistatic agent containing 10% of polyoxyethylenealkylamine fatty acid ester (trade name: PEX94AS-026, manufactured by Tokyo Ink Co., Ltd.) was added in an amount of 3%. This was extruded through a die to obtain a single layer foam sheet having a thickness of 1 mm. When the foam sheet washed with ethanol, the surface resistivity thereof considerably decreased.

COMPARATIVE EXAMPLE 3

Example 2 was repeated in the same manner as described except that the amount of the plasticizer was reduced to 3 parts and that the temperatures T1 and T2 of the first and second melts were adjusted to 107° C. and 116° C., respectively, as shown in Table 1.3. Satisfactory surface layers were not be obtainable and a desired composite sheet was not obtainable.

COMPARATIVE EXAMPLE 4

Example 2 was repeated in the same manner as described except that low density polyethylene (LDPE[g]) having a density of 915 kg/m$^3$, a melt viscosity of 170 Pa·s and a crystallization temperature of 91.4° C. (trade name: NUC8360, manufactured by Nippon Unicar Co., Ltd.) was substituted for LDPE[b] in the second melt for forming a surface layer, that no plasticizer was used and that the temperature T2 of the second melt was adjusted to 116° C., as shown in Table 1.3. Because of the very low melt viscosity of LDPE[g] in the second melt, the surface layers having no cracks were able to be formed. However, because of Mb>Ma, the antistatic efficiency was no good.

COMPARATIVE EXAMPLE 5

Example 2 was repeated in the same manner as described except that low density polyethylene LDPE[g] was substituted for LDPE[b] in the second melt for forming a surface layer, that the amount of the plasticizer was increased to 13 parts and that the temperature T2 of the second melt was adjusted to 108° C., as shown in Table 1.3. Because of Mb>Ma, the antistatic efficiency of the composite sheet was no good.

COMPARATIVE EXAMPLE 6

Example 2 was repeated in the same manner as described except that low density polyethylene LDPE[a] was substituted for LDPE[b] in the second melt for forming a surface layer, that IRGASTAT was substituted for PELESTAT and that the temperature T2 of the second melt was adjusted to 108° C., as shown in Table 1.3. IRGASTAT was a polymeric antistatic agent having a density of 1043 kg/m$^3$, a melt viscosity of 1110 Pa·s, a melting point of 180° C. and a crystallization temperature of 148.1° C. (trade name: IRGASTAT P18, manufactured by Ciba Speciality Chemicals Inc.) and containing a mixture of a polyetheresteramide and a polyamide as an essential ingredient. The composite sheet had cracks in the surface layers.

The cell diameter controlling agent master batch (I) used in the above Examples and Comparative Examples contained 11.8 parts of talc (trade name; HIFILLER#12, manufactured by Matsumura Sangyo Co., Ltd.) and 5.9 parts of sodium citrate per 100 parts of the low density polyethylene used.

The cell diameter controlling agent master batch (II) used in the Example 8 contained 19.4 parts of sodium citrate and 5.6 parts of sodium acid carbonate per 100 parts of the low density polyethylene used.

TABLE 1.1

| | Example No. | | | | |
|---|---|---|---|---|---|
| | 1 | 2 | 3 | 4 | 5 |
| First Melt | | | | | |
| PO resin | LDPE[a] | LDPE[a] | LDPE[a] | LDPE[a] | LDPE[a] |
| Tc (° C.) | 95.8 | 95.8 | 95.8 | 95.8 | 95.8 |
| Blowing agent | [butane] | [butane] | [butane] | [butane] | [butane] |
| Amount (part) *1 | 16 | 13 | 16 | 16 | 16 |
| T1 (° C.) | 108 | 108 | 107 | 107 | 107 |
| Second Melt | | | | | |
| PO resin | LDPE[a] | LDPE[b] | LDPE[c] | LDPE[a] | LDPE[d] |
| Ta (° C.) | 95.8 | 93.5 | 91.3 | 95.8 | 91.1 |
| Ma (Pa·s) | 850 | 640 | 460 | 850 | 330 |
| Antistatic agent | PRLESTAT | PRLESTAT | PRLESTAT | PRLESTAT | PRLESTAT |
| Amount (part) *2 | 43 | 43 | 43 | 43 | 43 |
| Mb (Pa·s) | 270 | 270 | 270 | 270 | 270 |
| Tb (° C.) | 90.0 | 90.0 | 90.0 | 90.0 | 90.0 |
| Plasticizer | [butane] | [butane] | [butane] | [butane] | [butane] |
| Amount (part) *3 | 16 | 7.5 | 16 | 16 | 16 |
| Index PI | 1.28 | 0.96 | 0.69 | 1.28 | 0.49 |
| T2 (° C.) | 108 | 115 | 109 | 108 | 108 |

*1: Amount per 100 parts of first polyolefin-based resin
*2: Amount per 100 parts of second polyolefin-based resin
*3: Amount per total of 100 parts of second polyolefin-based resin and polymeric antistatic agent

TABLE 1.2

| | Example No. | | | | |
|---|---|---|---|---|---|
| | 6 | 7 | 8 | Comp. 1 | Comp. 2 |
| First Melt | | | | | |
| PO resin | LDPE[a] | LDPE[a] | LDPE[e] | LDPE[a] | LDPE[a] |
| Tc (° C.) | 95.8 | 95.8 | 93.4 | 95.8 | 95.8 |
| Blowing agent | [butane] | [butane] | [butane] | [butane] | [butane] |
| Amount (part) *1 | 16 | 16 | 20 | 17 | 16 |
| T1 (° C.) | 108 | 108 | 110 | 108 | 108 |
| Second Melt | | | | | |
| PO resin | LDPE[a] | LDPE[a] | LDPE[f] | — | — |
| Ta (° C.) | 95.8 | 95.8 | 97.0 | — | — |
| Ma (Pa·s) | 850 | 850 | 1200 | — | — |
| Antistatic agent | PRLESTAT | PRLESTAT | PRLESTAT | — | — |
| Amount (part) *2 | 43 | 18 | 18 | — | — |
| Mb (Pa·s) | 270 | 270 | 270 | — | — |
| Tb (° C.) | 90.0 | 90.0 | 90.0 | — | — |
| Plasticizer | [DME] | [butane] | [butane] | — | — |
| Amount (part) *3 | 13 | 16 | 20 | — | — |
| Index PI | 1.28 | 0.52 | 0.16 | — | — |
| T2 (° C.) | 108 | 108 | 110 | — | — |

*1: Amount per 100 parts of first polyolefin-based resin
*2: Amount per 100 parts of second polyolefin-based resin
*3: Amount per total of 100 parts of second polyolefin-based resin and polymeric antistatic agent

TABLE 1.3

| | Example No. | | | |
|---|---|---|---|---|
| | Comp. 3 | Comp. 4 | Comp. 5 | Comp. 6 |
| First Melt | | | | |
| PO resin | LDPE[a] | LDPE[a] | LDPE[a] | LDPE[a] |
| Tc (° C.) | 95.8 | 95.8 | 95.8 | 95.8 |
| Blowing agent | [butane] | [butane] | [butane] | [butane] |
| Amount (part) *1 | 13 | 13 | 13 | 13 |
| T1 (° C.) | 107 | 108 | 108 | 108 |
| Second Melt | | | | |
| PO resin | LDPE[b] | LDPE[g] | LDPE[g] | LDPE[a] |
| Ta (° C.) | 93.5 | 91.4 | 91.4 | 95.8 |
| Ma (Pa·s) | 640 | 170 | 170 | 850 |
| Antistatic agent | PRLESTAT | PRLESTAT | PRLESTAT | IRGASTAT |
| Amount (part) *2 | 43 | 43 | 43 | 43 |
| Mb(Pa·s) | 270 | 270 | 270 | 1110 |
| Tb(° C.) | 90.0 | 90.0 | 90.0 | 148.1 |
| Plasticizer | [butane] | — | [butane] | [butane] |

TABLE 1.3-continued

| | Example No. | | | |
|---|---|---|---|---|
| | Comp. 3 | Comp. 4 | Comp. 5 | Comp. 6 |
| Amount (part) *3 | 3 | — | 13 | 16 |
| Index PI | 0.96 | 0.26 | 0.26 | 0.30 |
| T2 (° C.) | 116 | 116 | 108 | 108 |

*1: Amount per 100 parts of first polyolefin-based resin
*2: Amount per 100 parts of second polyolefin-based resin
*3: Amount per total of 100 parts of second polyolefin-based resin and polymeric antistatic agent Each of the foam sheets obtained in Examples 1 through 8 and Comparative Examples 1, 2, 4 and 5 was tested or measured for film forming property of the surface layer, apparent density, open cell content and surface resistivity (as such before and after treatment with ethanol). The results are summarized in Table 2 together with the content of antistatic agent in the foam sheet and thicknesses of the foam sheet and of the surface layers.

The film forming property was evaluated with naked eyes in terms of appearance and formation of cracks attributed to unsatisfactory extensibility of the extrudate of the second melt according to the following ratings:

A: no cracks and good appearance

B: cracks are formed and no good appearance

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

TABLE 2

| Example No. | Film Forming Property | Amount of Antistatic Agent(%) *4 | Apparent Density of the composite sheet (kg/m³) | Thickness of the composite Sheet (mm) | Thickness of Two Surface Layers (μm) | Open Cell Content of the composite sheet (%) | Surface Resistivity (Ω) | |
|---|---|---|---|---|---|---|---|---|
| | | | | | | | Before ethanol wash | After ethanol wash |
| 1 | A | 4.6 | 23 | 1 | 1.7/1.7 | 48 | $4.3 \times 10^{10}$ | $5.0 \times 10^{10}$ |
| 2 | A | 4.6 | 31 | 1 | 2.3/2.3 | 53 | $6.6 \times 10^{11}$ | $7.0 \times 10^{11}$ |
| 3 | A | 4.6 | 23 | 1 | 1.7/1.7 | 48 | $7.0 \times 10^{10}$ | $7.8 \times 10^{10}$ |
| 4 | A | 0.8 | 23 | 5 | 8.8/8.8 | 40 | $3.3 \times 10^{10}$ | $3.3 \times 10^{10}$ |
| 5 | A | 4.6 | 23 | 1 | 1.7/1.7 | 45 | $3.3 \times 10^{11}$ | $4.3 \times 10^{11}$ |
| 6 | A | 4.6 | 23 | 1 | 1.7/1.7 | 48 | $5.0 \times 10^{10}$ | $5.2 \times 10^{10}$ |
| 7 | A | 2.3 | 23 | 1 | 1.7/1.7 | 45 | $2.1 \times 10^{11}$ | $2.5 \times 10^{11}$ |
| 8 | A | 4.4 | 35 | 0.8 | 4.0/4.0 | 35 | $9.8 \times 10^{10}$ | $1.2 \times 10^{11}$ |
| Comp. 1 | — | 17.6 | 29 | 2 | — | 80 | $2.0 \times 10^{10}$ | $3.0 \times 10^{10}$ |
| Comp. 2 | — | — | 23 | 1 | — | 50 | $1.6 \times 10^{11}$ | more than $1.0 \times 10^{14}$ |
| Comp. 3 | B | — | — | — | — | — | — | — |
| Comp. 4 | A | 4.6 | 31 | 1 | 2.3/2.3 | 55 | $5.0 \times 10^{13}$ | $6.0 \times 10^{13}$ |
| Comp. 5 | A | 4.6 | 31 | 1 | 2.3/2.3 | 45 | $3.0 \times 10^{13}$ | $4.0 \times 10^{13}$ |
| Comp. 6 | B | 4.6 | — | — | — | — | — | — |

*4: Percentage per total amount of composite sheet

What is claimed is:

1. A method of producing a composite sheet having a polyolefin-based resin foam layer and a polyolefin-based resin surface layer provided on at least one side of said foam layer and containing an antistatic agent, comprising the steps of:

providing a first melt comprising a first polyolefin-based resin and a physical blowing agent;

providing a second melt comprising a second polyolefin-based resin having a crystallization temperature of Ta [° C.] and a melt viscosity of Ma [Pa·s], a polymeric antistatic agent having a crystallization temperature of Tb [° C.] and a melt viscosity of Mb [Pa·s] in an amount of 4 to 100 parts by weight per 100 parts by weight of said second polyolefin-based resin, and a volatile plasticizer in an amount of 5 to 50 parts by weight per 100 parts by weight of a total amount of said second polyolefin-based resin and said polymeric antistatic agent, Ta, Tb, Ma and Mb satisfying the following conditions:

$Tb < (Ta + 30° C.)$ $Mb < Ma$; and coextruding said first melt and second melt through a die to obtain the composite sheet.

2. The method as claimed in claim 1, wherein Tb is 120° C. or less.

3. The method as claimed in claim 1, wherein Mb is 400 Pa·s or less.

4. The method as claimed in claim 1, wherein said volatile plasticizer is at least one compound selected from the group consisting of aliphatic hydrocarbons having 2 to 7 carbon atoms, alicyclic hydrocarbons having 2 to 7 carbon atoms, halogenated aliphatic hydrocarbons having 1 to 3 carbon atoms, aliphatic alcohols having 1 to 4 carbon atoms, and aliphatic ethers having 2 to 8 carbon atoms.

5. The method as claimed in claim 1, wherein said second polyolefin-based resin is a polyethylene-based resin.

6. The method as claimed in claim 1, wherein said first polyolefin-based resin is a polyethylene-based resin.

7. The method as claimed in claim 1, wherein said surface layer has a thickness of 50 μm or less.

8. The method as claimed in claim 1, wherein said surface layer has a thickness of 1 to 25 μm.

9. The method as claimed in claim 1, wherein said composite sheet has an apparent density of 15 to 100 kg/m³.

10. The method as claimed in claim 1, wherein said composite sheet has an apparent density of 20 to 50 kg/m³.

* * * * *